United States Patent [19]

Sato

[11] Patent Number: 5,459,797
[45] Date of Patent: Oct. 17, 1995

[54] CHARACTER READING SYSTEM

[75] Inventor: Toshio Sato, Tokyo, Japan

[73] Assignee: Kabushiki Kaisha Toshiba, Kawasaki, Japan

[21] Appl. No.: 173,275

[22] Filed: Dec. 23, 1993

Related U.S. Application Data

[63] Continuation of Ser. No. 856,588, Mar. 20, 1992, abandoned.

[30] Foreign Application Priority Data

Mar. 30, 1991  [JP]  Japan .................. 3-093652

[51] Int. Cl.$^6$ .............................. G06K 9/46; G06K 9/66
[52] U.S. Cl. .................. 382/165; 382/170; 358/518
[58] Field of Search ...................... 382/16, 17, 18; 358/518, 515, 521

[56] References Cited

U.S. PATENT DOCUMENTS

| | | | |
|---|---|---|---|
| 3,999,047 | 12/1976 | Green | 382/17 |
| 4,695,884 | 9/1987 | Anastassiou et al. | 382/51 |
| 4,879,594 | 11/1989 | Stansfield et al. | 358/518 |
| 4,884,130 | 11/1989 | Huntsman | 358/518 |
| 4,893,177 | 1/1990 | Tada et al. | 358/515 |
| 4,941,184 | 7/1990 | Sato | 382/17 |
| 4,962,540 | 10/1990 | Tsujiuchi et al. | 382/17 |
| 4,998,286 | 3/1991 | Tsujiuchi et al. | 382/17 |
| 5,003,613 | 3/1991 | Lovelady et al. | 382/17 |
| 5,010,580 | 4/1991 | Vincent et al. | 382/17 |
| 5,014,328 | 5/1991 | Rudak | 362/17 |
| 5,031,035 | 7/1991 | Abe | 358/80 |
| 5,085,325 | 2/1992 | Jones et al. | 382/17 |
| 5,142,356 | 8/1992 | Usami et al. | 358/80 |
| 5,155,587 | 10/1992 | Itoh | 358/515 |
| 5,185,661 | 2/1993 | Ng | 358/515 |
| 5,335,292 | 8/1994 | Lovelady et al. | 382/17 |

FOREIGN PATENT DOCUMENTS

| | | |
|---|---|---|
| 57-143683 | 9/1982 | Japan . |
| 215387 | 1/1990 | Japan . |
| 273476 | 3/1990 | Japan . |
| 3191482 | 8/1991 | Japan . |

OTHER PUBLICATIONS

Sato et al, "Automatic Gray-Level Extraction from Bicolor Printing" 1990 IEICE Fall Conference, Oct. 1990.

Primary Examiner—Leo H. Boudreau
Assistant Examiner—Christopher S. Kelley
Attorney, Agent, or Firm—Cushman, Darby & Cushman

[57] ABSTRACT

A system for reading characters on an object is provided. The system first obtains color data relating to each color component from the object in which characters expressed in a first color and information expressed in at least a second and a third color which differ from the first color are mixed. Then the color data relating to each color component of the background color of the object and the information expressed in the second and the third color other than the characters are converted in such a way that the influence on the color data relating to each color component of the characters expressed by the first color becomes minimal. After that, only the color data related to each color component of the characters expressed in the first color is extracted by converting the color relating to the each color component.

2 Claims, 17 Drawing Sheets

DENSITY

F I G. 1 3
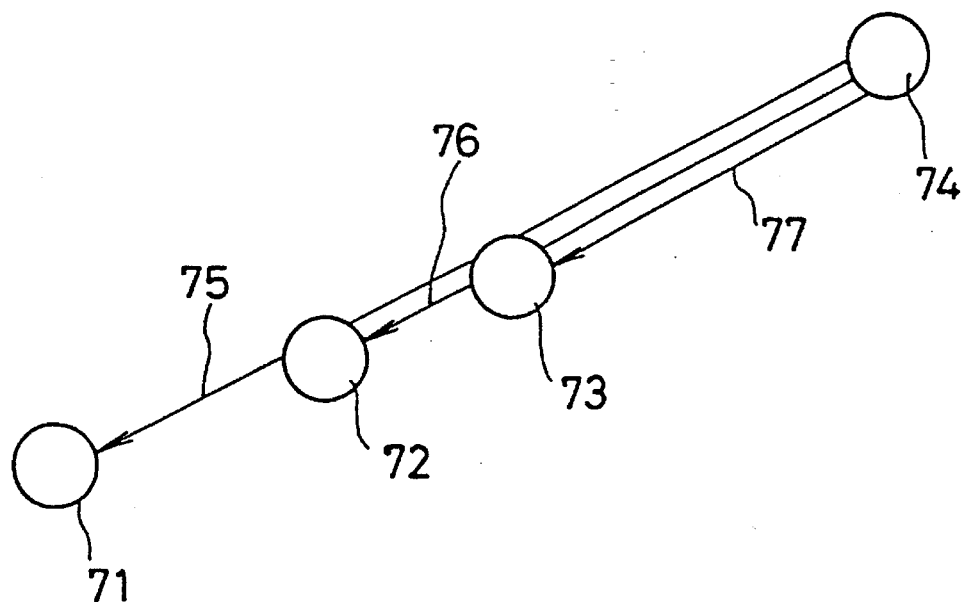

CHARACTER READING SYSTEM

This is a continuation of application No. 07/856,588, filed on Mar. 20, 1992, abandoned.

BACKGROUND OF THE INVENTION

1. Field of the Invention

The present invention relates to a character reading system which can read only characters from an object to be read, for instance as a preliminary process in character recognition.

2. Description of the Related Art

A high degree of reading technology is required in optical character readers when the recording on the object to be read, which becomes the subject for reading, is in an arbitrary format. Therefore, in conventional optical character readers, the objects to be read were prepared by providing entry frames for restricting the entry positions of characters, etc.

Normally, the entry frame on the object to be read is not required in the character recognition stage. For this reason, it is printed in a special color so that it is easy to drop out or erase. However, the choice of this color is limited, there is a limit to the colors which can be used for the entry frames.

Therefore, as means of enabling the extension of the limits to colorings for entry frames, various systems have been proposed, as disclosed in, for instance, Japanese Laid-Open Patent No. Showa 57-143683 and Japanese Patent Application No. Heisei 2-254308.

However, these are for dropping out entry frames in monochrome. It is difficult to drop out the entry frames in the cases of objects to be read with entry frames in two or more colorings. In particular, with the system where an optical filter is used, this system is at a disadvantage where the coloring is faint in the colored object.

The technology for the extraction of the serial number overprinted on the pattern on valuable securities such as banknotes is known, for example Japanese Laid-Open Patent No. Heisei 3-191482 and Japanese Laid-Open Patent No. Heisei 2-73476. In the former system, the color information is used to extract a specified color, this can be used for an object which is a pattern of two or more types of coloring, but the extraction output (character separation by color information) is a binary image. Compared with this, in the latter system, the character including variable density information can be extracted but this is for objects which are patterns of one type of coloring (monochrome).

For example, as technology for extracting the postal code from mail containing the entry frame and the special delivery stamp or indicia thereon, the former system (Japanese Laid-Open Patent No. Heisei 3-191482) is useful. However, this system has disadvantages that, as the extraction output is a binary image, blurred postal codes are extracted and the special delivery stamp etc. having variable density information cannot be completely dropped out.

The problem with prior art such as the above-mentioned, is that where there are two or more types of colorings in the information to be dropped out from the object, this dropping out cannot be done with accuracy.

As described above, in conventional optical character readers, there was the disadvantage of not being able to drop out the entry frames in objects to be read with entry frames of two or more colorings.

SUMMARY OF THE INVENTION

It is an object of the present invention to provide a character reading system which is capable of reading only the characters from an object to be read which has information of multiple colorings which should be dropped out, and can improve the degree of freedom of the colorings for information which should be dropped out in the object to be read.

It is another object of the present invention to provide a character reading system which enables improved accuracy of the processing.

According to the present invention there is provided a character reading system comprising means for obtaining color data relating to each color component from an object in which characters expressed in a first color and information expressed in at least a second and a third color which differ from the first color are mixed, means for converting the color data relating to each color component of the background color of the object and the information expressed in the second and the third color other than the characters in such a way that the influence on the color data relating to each color component of the characters expressed by the first color becomes minimal, and means for extracting only the color data related to each color component of the characters expressed in the first color by converting the color relating to the each color component obtained by the obtaining means using the converting means.

Further, according to the present invention there is provided a character reading system comprising means for obtaining data relating to each color component of information expressed in plural colors mixed with other matter on an object, means for calculating the appearance frequency of data relating to each of the color components obtained by the obtaining means, means for detecting the peaks of the appearance frequency calculated by the calculating means, means for selecting the peaks which have the maximum brightness from within the peaks detected by the detecting means, means for converting the data relating to the peaks into standardized directional vector data from the peaks having the maximum brightness selected by the selecting means, means for classifying the vector data converted by the converting means into plural groups, means for discriminating the plural colors in the object from the results of the classification by the classifying means, means for computing the parameters from the results of the discrimination by the discriminating means to extract the information of the specified color from the object, and means for processing the data relating to each color component obtained by the obtaining means in accordance with the parameters computed by the computing means.

BRIEF DESCRIPTION OF THE DRAWINGS

FIG. 12 is a drawing showing an example of the distribution of the peaks;

FIG. 13 is a drawing showing conceptually the conversion to directional vectors of the peak data;

FIG. 15 is a drawing showing an example of when the peak data is classified after directional vector conversion has been performed;

FIG. 16 is a drawing showing an example of when the peak data is classified without conversion to directional vectors;

DETAILED DESCRIPTION OF THE PREFERRED EMBODIMENTS

Referring to the accompanying drawings, a detailed description will subsequently be given of the preferred embodiment of the present invention.

Figure 1:
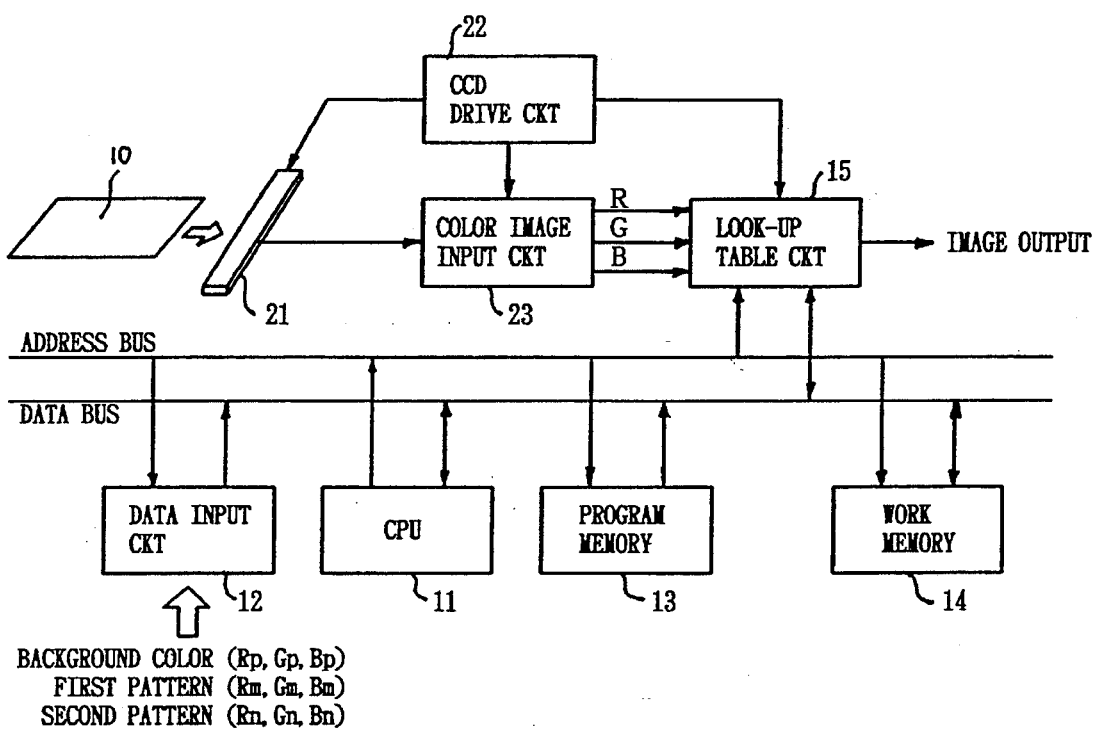
FIG. 1 is a block diagram showing the essential parts of the construction of a character reading system in an embodiment of the present invention.

FIG. 1 shows the construction of the character reading system in the present invention.

In FIG. 1, CPU 11 controls the whole system. Data input circuit 12, program memory 13, work memory 14 and look-up table circuit 15 are connected to CPU 11 via an address bus and a data bus.

Light from a light source (not shown) is irradiated on object 10, as the subject for reading, which is transported toward the direction of the arrow shown in FIG. 1. The light reflected from the surface of object 10 forms an image on color image sensor 21. In this case, color image sensor 21 is composed of a CCD array made of, for instance, red (R), green (G) and blue(B). Therefore, the color data of each component, that is, analog image signals of R, G and B, are produced by photoelectric conversion of the intensity of the reflected light.

The output of color image sensor 21 is read according to the signal from CCD drive circuit 22. This is converted to R, G, B digital image signals by color image input circuit 23. Each output of color image input circuit 23 is supplied to look-up table circuit 15 in synchronisation with the output of signals from CCD drive circuit 22.

Look-up table circuit 15 is for image conversion so that the influence of the outputs from color image input circuit 23 on the characters which should be read on object 10 becomes small. By this means, a variable density image in which only the characters have been extracted is obtained as the final image output.

Look-up table circuit 15 stores the operating parameters which are calculated based on the RGB value, (Rp, Gp, Bp) which represents the background color of object 10 and the RGB values (Rm, Gm, Bm) and (Rn, Gn, Bn) which represent, for instance, the first and second patterns as the information to be dropped out which are inputted by data input circuit 12. These operating parameters can be rewritten according to a processing program which is stored in program memory 13 by CPU 11.

Figure 2:
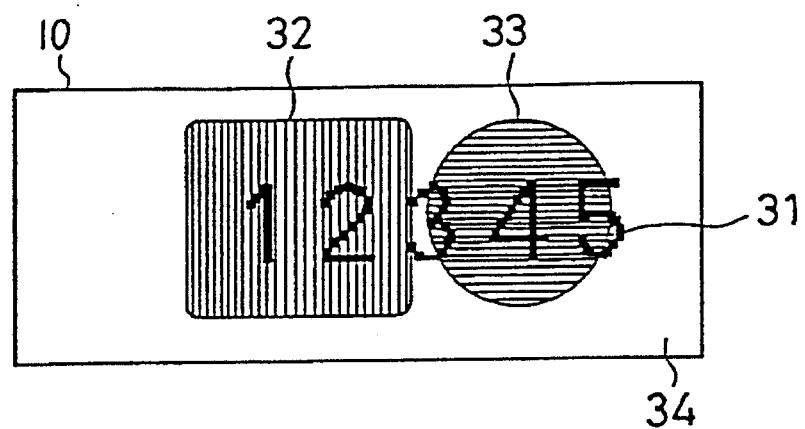
FIG. 2 is a drawing showing an object to be read in an embodiment of the present invention.

FIG. 2 shows object 10 which is processed by this character reading system.

Characters 31 to be read which are expressed in a first color and first and second patterns 32 and 33 as information to be erased, which are expressed in at least a second and a third color which differ from that of characters 31, are present on the surface of object 10.

The RGB values (Rp, Gp, Bp) (Rm, Gm, Bm) and (Rn, Gn, Gn) which represent, for instance, background color 34 and first and second patterns 32 and 33 are obtained beforehand as input data to data input circuit 12 for object 10.

Next, the method of obtaining the operating parameters for rewriting look-up table circuit 15 will now be described.

Figure 3:
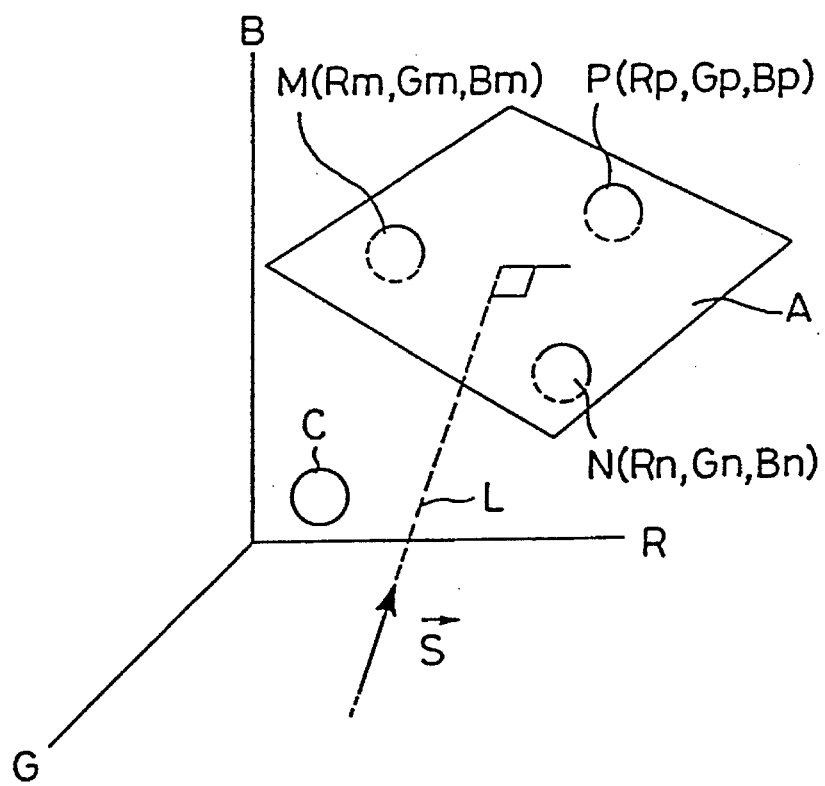
FIG. 3 is a drawing to illustrate the method of calculating the operating parameters in an embodiment of the present invention.

In object 10, the RGB value (Rp, Gp, Bp) which represents background color 34, the RGB value (Rm, Gm, Bm) which represents first pattern 32 and the RGB value (Rn, Gn, Bn) which represents second pattern 33 are respectively positioned as three points P, M and N in the RGB color space, as shown in FIG. 3. These three points P, M and N in three-dimensional space for plane A.

In the RGB space, the distances from plane A to each of the points P, M and N are all "0". The distance to a character at point C, which it is desired to extract, has a value of "≠0". Therefore, it is possible easily to extract only the characters by using the distances from plane A.

Plane A can be expressed as Equation (1) using four constants c, d, e and f. In this case, since plane A passes through the three points P, M and N, when the coordinates of the three points P, M and N are substituted in Equation (1), Equations (2), (3) and (4) are respectively established.

$$cR+dG+eB+f=0 \qquad (1)$$

$$cRp + dGp + eBp + f = 0 \quad (2)$$

$$cRm + dGm + ebro + f = 0 \quad (3)$$

$$cRn + dGn + eBn + f = 0 \quad (4)$$

In Equations (1) to (4), all of constants c, d, e and f should have solutions of values of "≠0", that is, other than c=0, d=0, e=0 and f=0. That is, the above four equations are equivalent to the case which has a solution other than the self-explanatory solution of homogeneous simultaneous linear equations.

Here, since the determinant of the coefficient matrix becomes "0", the determinant relationship shown in Equation (5) is established.

$$H = \begin{vmatrix} R & G & B & 1 \\ Rp & Gp & Bp & 1 \\ Rm & Gm & Bm & 1 \\ Rn & Gn & Bn & 1 \end{vmatrix} = 0 \quad (5)$$

When the determinant of this Equation (5) is developed linearly, Equations (6), (7), (8), (9) and (10) are obtained.

$$H = QR + SG + TB + U = 0 \quad (6)$$

$$Q = (-1)^2 \begin{vmatrix} Gp & Bp & 1 \\ Gm & Bm & 1 \\ Gn & Bn & 1 \end{vmatrix} = \quad (7)$$

$$GnBp + GmBn + GpBm - BmGn - BnGp - BpGm$$

$$S = (-1)^3 \begin{vmatrix} Rp & Bp & 1 \\ Rm & Bm & 1 \\ Rn & Bn & 1 \end{vmatrix} = \quad (8)$$

$$-(RnBp + RmBn + RpBm - BmRn - BnRp - BpRm)$$

$$T = (-1)^4 \begin{vmatrix} Rp & Gp & 1 \\ Rm & Gm & 1 \\ Rn & Gn & 1 \end{vmatrix} = \quad (9)$$

$$RnGp + RmGn + RpGm - GmRn - GnRp - GpRm$$

$$U = (-1)^5 \begin{vmatrix} Rp & Gp & Bp \\ Rm & Gm & Bm \\ Rn & Gn & Bn \end{vmatrix} = \quad (10)$$

$$-(RnGpBm + RmGnGp + RpGmBn - RnGmBp - RpGnBm - RmGpBn)$$

By making constants, c, d, e and f respectively c=Q, d=S, e=T and f=U, Equation (1) agrees with Equation (6). Therefore, this Equation (6) becomes the equation of plane A which is to be found.

It is well-known that the direction ratio of the normal to plane A is Q:S:T.

Figure 4:
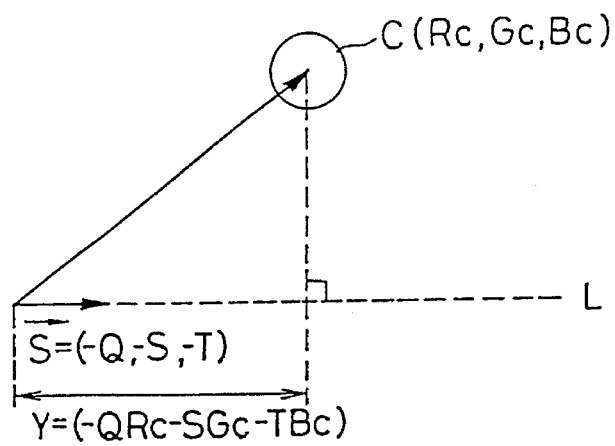
FIG. 4 is a drawing to illustrate the way of finding the mapping values concerned in calculating the operating parameters in an embodiment of the present invention.
Figure 5:
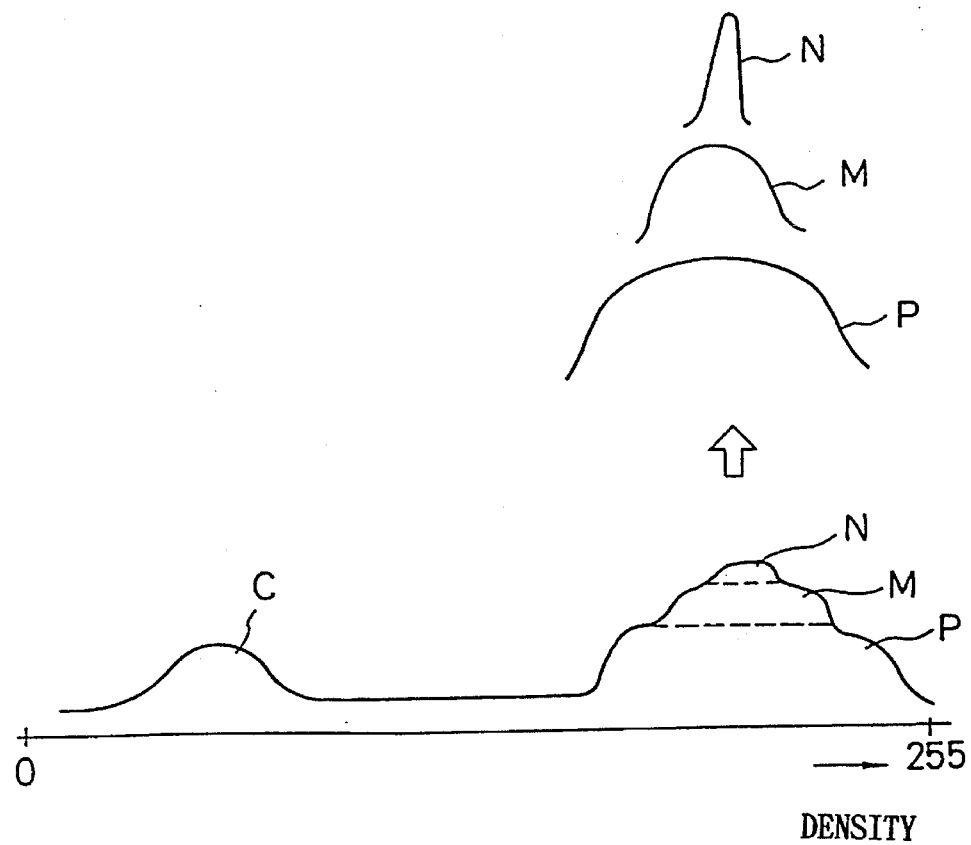
FIG. 5 is a drawing showing an example of density distribution in a variable density image in an embodiment of the present invention.

The distance from plane A can be obtained by mapping to straight line L perpendicular to plane A. Therefore, if a value such as Equation (11) is used for the size 1 vector $\vec{S}$ shown in FIG. 3 (hereafter, the vector is defined in the same way in this paper), the value Y which has a relationship with the distance from plane A (the mapping value to straight line L) can be obtained by the scalar product of the vector for point C (Rc, Gc, Bc) of any color coordinate space such as shown in FIG. 4.

$$\text{Vector } \vec{S} = (-Q, -S, -T)/(Q^2 + S^2 + T^2)^{1/2} \quad (11)$$

Mapping value Y is shown by Equation (12). This mapping value Y takes "0" at point 0 of the color space. It also reflects the distance from plane A in which it takes the maximum value in plane A.

$$Y = -QRc - SGc - TBc \quad (12)$$

In this way, if the respective Q, S, T are found by substituting the RGB values which represent background color 34 of inputted object 10 and the first and second patterns 32 and 33 in Equation (6), they can be converted to a variable density image in which only the characters are extracted from the digital image signal by Equation (7). That is, by applying the above method, the points P, M and N of background color 34 of object 10 and first and second patterns 32 and 33 become almost the same density values. Therefore, conversion to an image with a density distribution which can easily be distinguished from point C of character 31 becomes possible.

In this embodiment, since the above image conversion is executed at high speed, the operating parameters found by calculation beforehand for all the combinations of inputted RGB values are written in look-up table circuit 15.

The operation for reading only the characters from object 10 will now be described fop the above construction.

For instance, in the case of dropping out first and second patterns 32 and 33 on object 10, each digital image signal for R, G and B read from object 10 is transmitted to look-up table circuit 15.

At this time, the RGB values for background color 34 and first and second patterns 32 and 33 on object 10 are supplied from data input circuit 12. The operating parameters for converting the above digital image data to a variable density image in which only character 31 has been extracted have already been re-written by CPU 11.

Therefore, each digital image signal for R, G and B which has been transmitted to look-up table circuit 15 is converted at high speed to a variable density image in which only character 31 has already been extracted, and is outputted.

In the above way, the colorings of the information to be dropped out and their types can be made unlimited.

That is, a variable density image in which only the characters have been extracted can be obtained by calculating the operating parameters based on the RGB values of the ground color of the object and the patterns to be dropped out, and using these operating parameters. By this means, by re-writing the operating parameters for each type of object, any object can be made a subject for processing. Therefore, only the characters can easily be read from objects possessing multiple patterns of different colorings to be dropped out. It also becomes possible to improve the degree of freedom of colorings of patterns to be dropped out in objects.

The another embodiment of the present invention will now be described.

Figure 6:
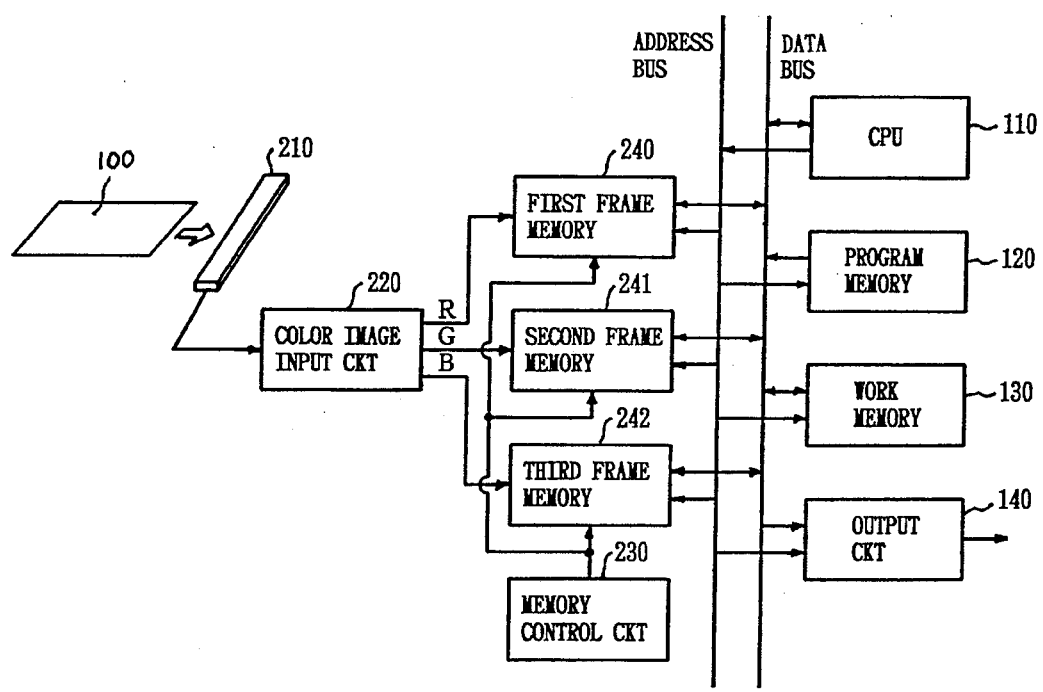
FIG. 6 is a block diagram showing the construction of a character reading system in another embodiment of the present invention.

FIG. 6 shows the construction of a character reading system according to the present invention.

As shown in FIG. 6, CPU 110 controls the whole system. This CPU 110 is connected, via an address bus and a data bus to program memory 120, work memory 130, output circuit 140 and first to third frame memories 240, 241 and 242.

Object 100 (for example, color printed matter such as valuable securities) to be read, is transported in the direction of the arrow shown in the drawing, object 100 is illuminated by light from a light source (not shown). The light reflected from the surface of object 100, forms an image on color image sensor 210. Color image sensor 210 is composed of a CCD array made of, for instance, red (R), green (G) and blue (B). Accordingly, the color data of each color component, that is, analog image signals of R, G and B, are produced by photoelectric conversion of the intensity of the reflected light.

The output from the above-mentioned color image sensor 210, that is, the image data of the three RGB components corresponding to the entire object 100, is converted into the R, G, B digital image signals by color image input circuit 220. Each output from this color image input circuit 220 is stored in first to third frame memories 240, 241 and 242 as controlled by memory control circuit 230.

On completion of the storing into frame memories 240, 241 and 242 the control from memory control circuit 230 is switched to CPU 110. In accordance with the processing program housed in program memory 120, the extraction of the characters (described below) is performed on object 100.

Figure 7:
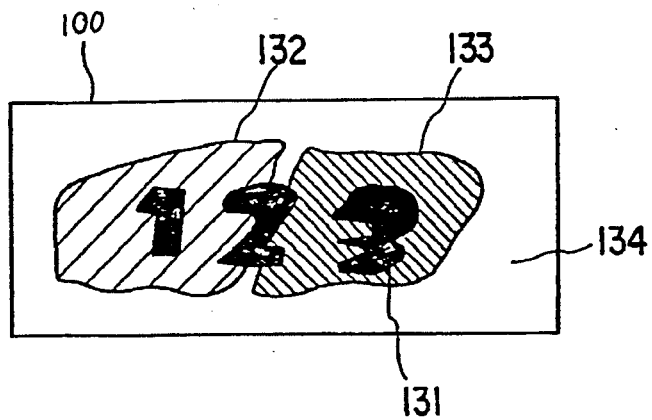
FIG. 7 is a drawing showing an example of an object to be read for processing by the character reading system shown in FIG. 6.

FIG. 7 shows an example of object 100 processed by this character reading system.

On background 134 of object 100, is for example information expressed in second and third colors printed in the individual first and second patterns 132 and 133, extending over this, the information expressed in the first color different from the first and second patterns 132 and 133 is overprinted character 131.

The operation of the above-mentioned construction will now be described.

Figure 8:
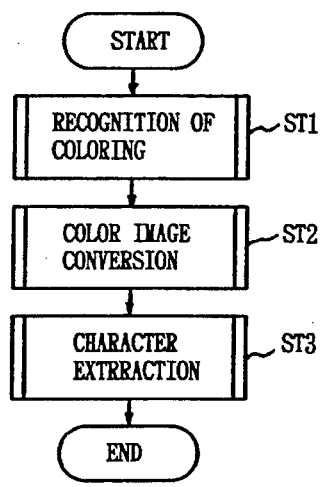
FIG. 8 is a flowchart showing an explanation of the processing route of the reading operation in the character reading system shown in FIG. 6.

FIG. 8 is a flowchart for the process of extraction of the characters.

The color image is input, firstly the recognition of every color used in the printed coloring is performed (Step ST1), then using the results of this, the color image conversion is performed (Step ST2) then finally the extraction of character 131 performed (Step ST3).

Figure 9:
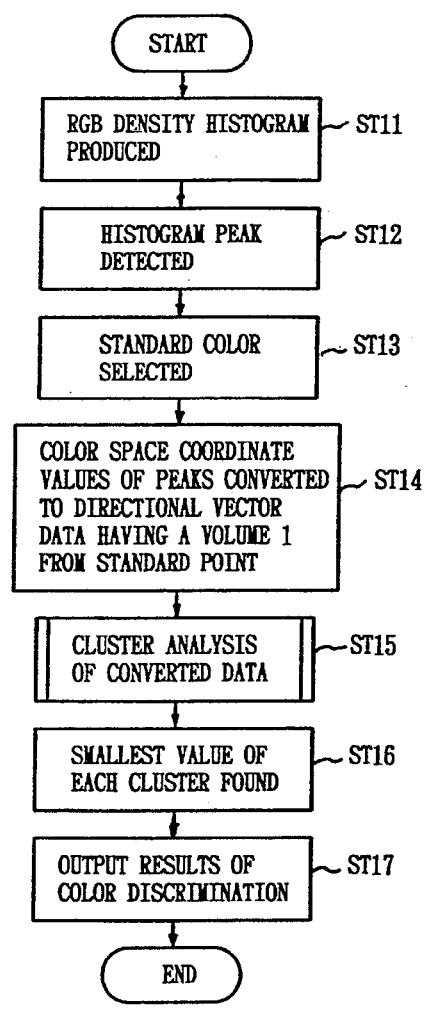
FIG. 9 is a flowchart showing an explanation of the processing route of the color recognition in the character reading system shown in FIG. 6.

FIG. 9 shows the flowchart for the process of the above-mentioned recognition of the coloring.

As for the above-mentioned, when the processing of the RGB image input is completed, the frequency of the digital image signal for each of the R, G and B is produced, expressed as a density histogram (Step ST11). This is found and embodied from the histogram data Ht(R,G,B) of the three dimensional appearance frequency value of the three variables of R, G, and B in the total pixels of the color image.

Figure 10:
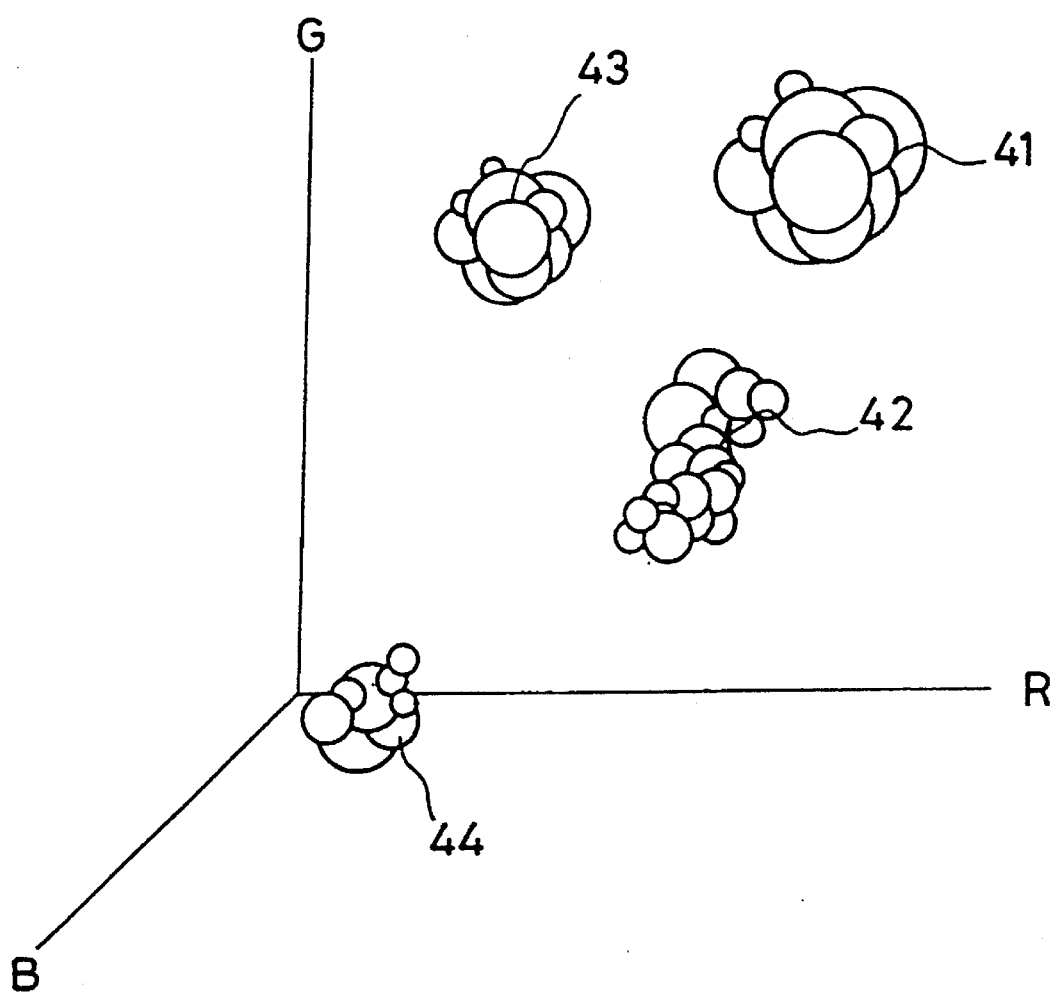
FIG. 10 is a drawing showing conceptually the behaviors of the appearance frequency of the three colors used in the printing.

This histogram data Ht(R,G,B) can be understood as the quantity (diameter of spheres) existing in expanded space of the three axes of the R, G and B, for example as shown in FIG. 10.

Figure 11:
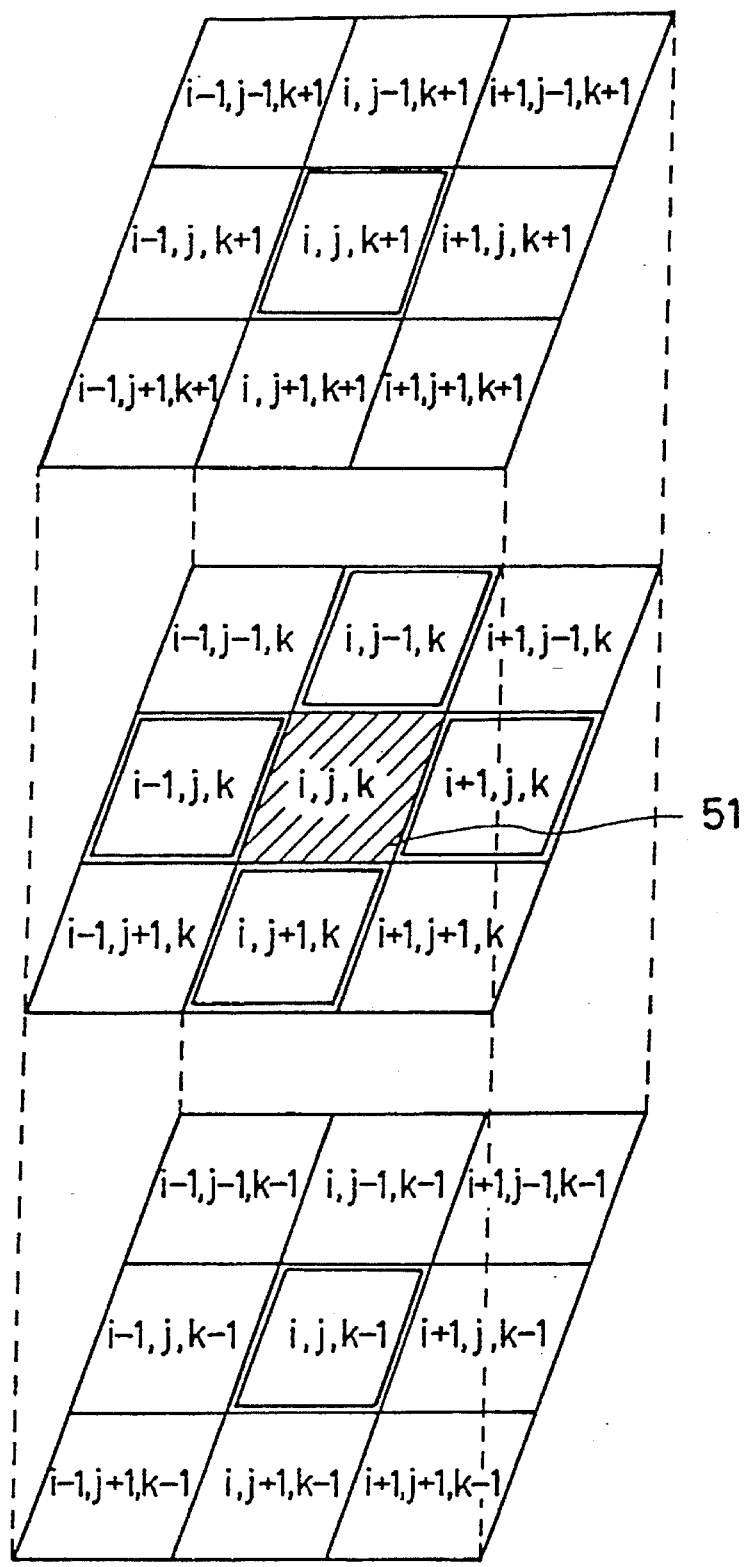
FIG. 11 is a drawing showing an example of the arrangement of the neighboring points used in processing the detected peaks.

When the processing producing the RGB density histogram is complete, detection of the peak of this histogram data Ht(R,G,B) is performed (Step ST12). This is embodied by searching for the greatest frequency of neighboring points in the double frame as shown in FIG. 11, of each value 41, 42, 43 and 44 respectively in the three dimensional space as shown in FIG. 10.

That is, peak 51 is found from the relationship of Equation (14) satisfying all of the histogram data Ht(R, G, B) of i, j, k converted to the data Hp(i,J,k) by Equation (13).

$$Hp(i,j,k) = 6 \times Ht(i,j,k) - Ht(i - 1,j,k) - \tag{13}$$

$$Ht(i,j - 1,k) - Ht(i,j,k - 1) - Ht(i + 1,j,k) -$$

$$Ht(i,j + 1,k) - Ht(i,j,k + 1)$$

$$Hp(i,j,k) \geq Hp(i + 1,j,k), \tag{14}$$

-continued
$$Hp(i,j,k) \geq Hp(i,j + 1,k), Hp(i,j,k) \geq Hp(i,j,k + 1),$$

$$Hp(i,j,k) \geq Hp(i,j - 1,k), Hp(i,j,k) > Hp(i - 1,j,k),$$

$$Hp(i,k,k) > Hp(i,j,k - 1), \text{ and } Hp(i,j,k) > 0$$

Each axis of R, G, B in FIG. 10 corresponds to i, j, k in FIG. 11.

Figure 12:
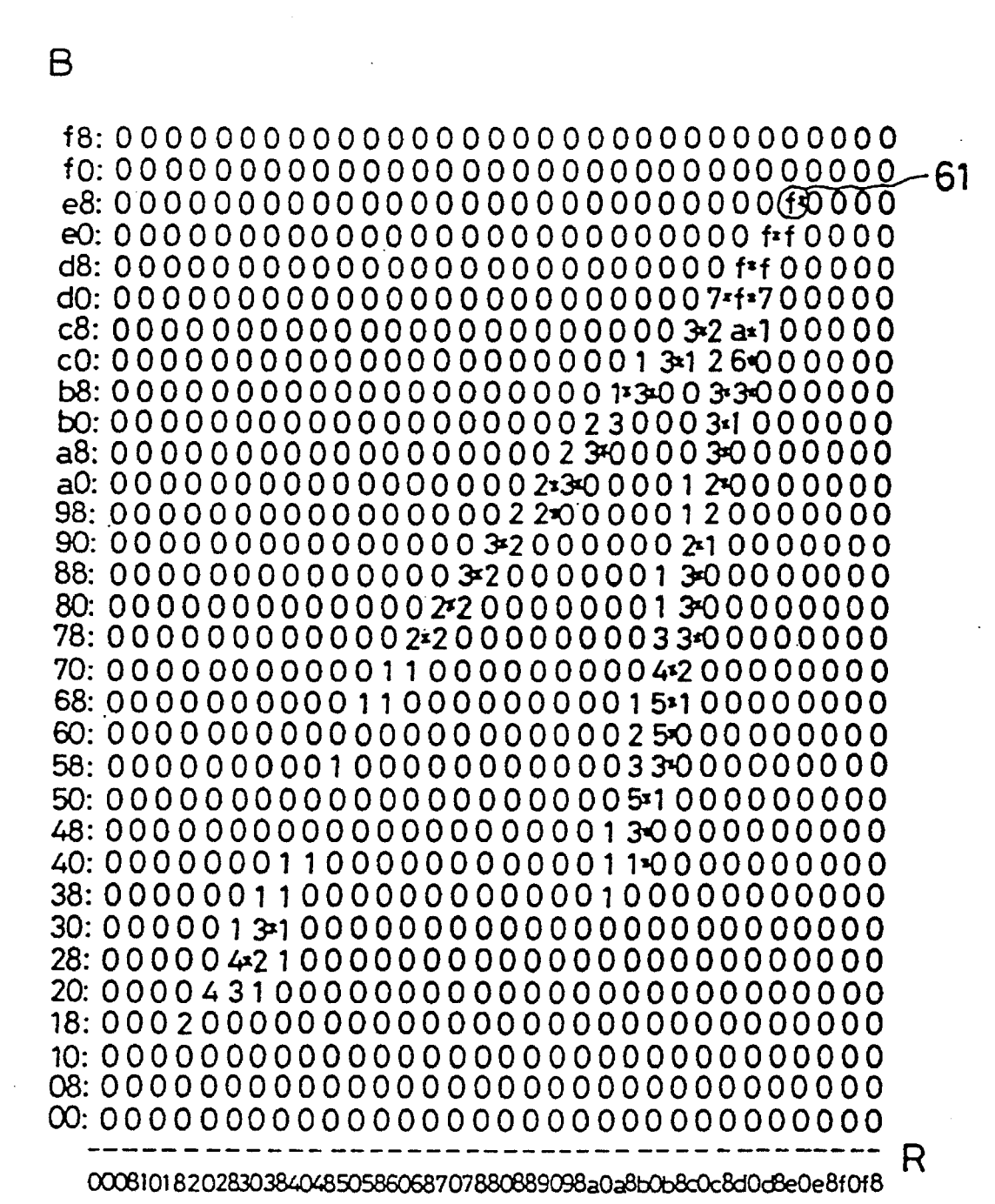

In the case of object 100 as shown in FIG. 7, these peaks 51 are arranged in the color spaces as points (spheres) or line segments (bars) for the color of background 134 of object 100 and the three colors used for printing character 131 and patterns 132 and 133 making a total of four colors, for example as shown in FIG. 12.

FIG. 12 shows the frequency distribution of the R component and the G component, the frequencies are shown as 0 to 9, a to f and the peaks are marked by * (asterisks).

Within the above-mentioned frequency distribution, arranged as line segments, error is produced by color image input circuit 220, consequently, the distribution of the two colors becomes superimposed. Therefore, in the example of FIG. 12, in the presence of the distribution of the line segments of the peaks, the color used for printing is judged from point 61 corresponding to the color of the background 134 of object 100.

In order for the three colors used in the printing to be classified exactly from the distribution of line segments and points of these peaks, the effect of the error from the above-mentioned color image input circuit 220 must be removed. Consequently, in all of the peaks the direction of the color of the background 134 of object 100 is observed. In this case the data is converted so that the peaks of the line segments are all in the same direction so that the classification of the peaks becomes easy.

The color of the background 134 of object 100 is Pa(Rp, Gp,Bp), the arbitrary peak color is Ki(Rki,Gki,Bki) and, this conversion is sought by Equation (15) as Ki'(Rki',Gki',Bki') (Step ST14).

$$Ki'(Rki',Gki',Bki') = ((Rp - Rki)/N, \tag{15}$$
$$(Gp - Gki)/N, (Bp - Bki)/N)$$
$$N = \{(Rp - Rki)^2 + (Gp - Gki)^2 + (Bp - Bki)^2\}^{1/2}$$
$$i \epsilon A \text{ (A is the set of the peaks)}$$

The results of this are, for example as shown in FIG. 13, when the color Pa of the background 134 of object 100 is the standard point 74, the three data 75, 76, 77 corresponding to each of the three points 71, 72, 73 are the same value.

In order to perform the computation by the above-mentioned Equation (15), the color Pa of the background 134 of object 100 must be found (Step ST13). The peaks given as the volume of maximum brightness RGB data can be found from this by Equation (16).

$$(Rp,Gp,Bp) = \max(Rki^2 + Gki^2 + Bki^2) \tag{16}$$
$$i = A$$

With respect to the peaks selected by this Equation (16), in order that the conversion by the above-mentioned Equation (15) becomes infinity, the set of the peaks A must be removed.

The color Pa of the background 134 of object 100 in the standard color selection process of Step ST13 was found by the above-mentioned Equation (16), this is succeeded by Step ST14, after the peaks have been converted to vector data in accordance with the above-mentioned Equation (15), the converted data is classified into three groups by cluster analysis (Step ST15).

Figure 14:
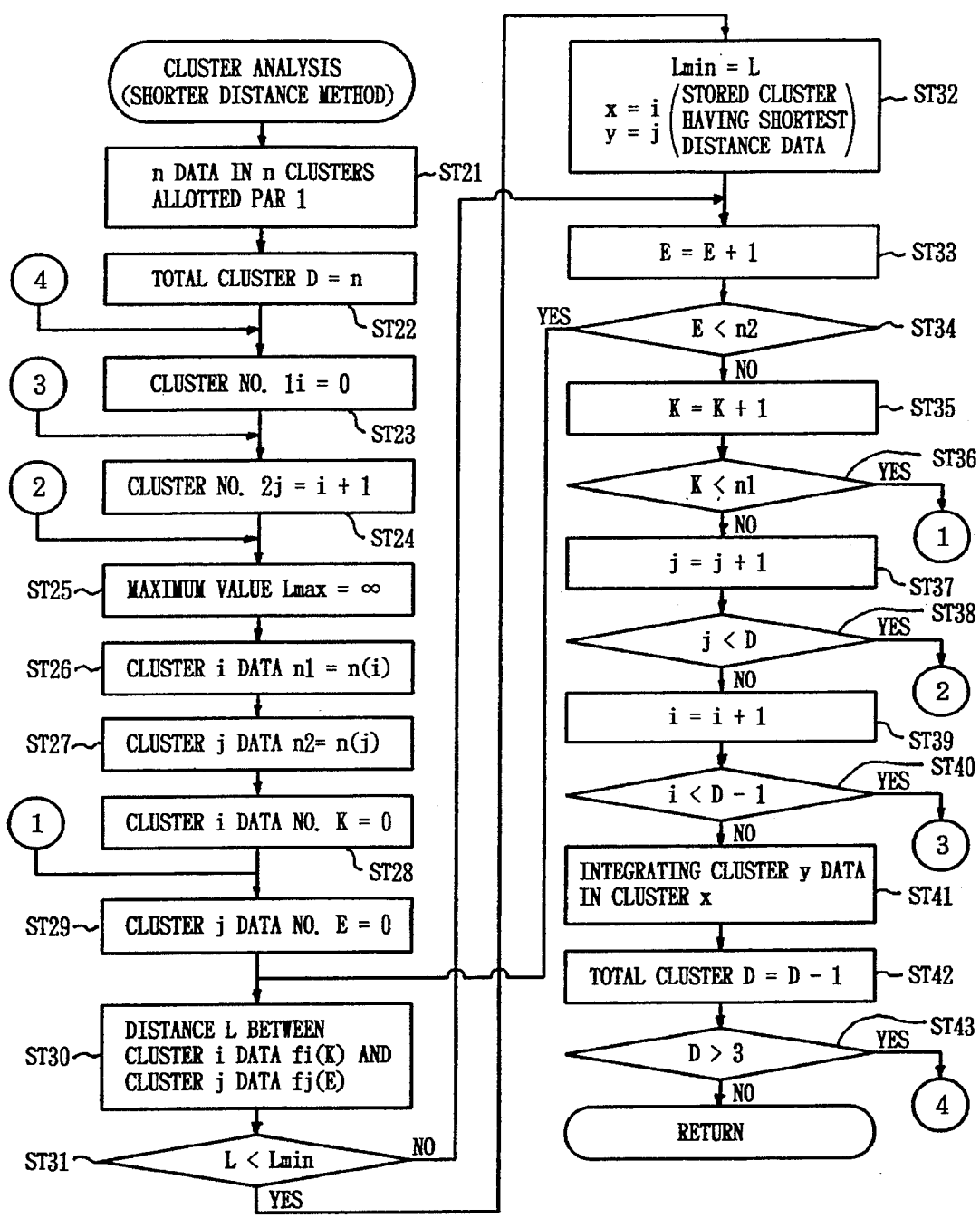
FIG. 14 is a flowchart showing the routine of the processing by cluster analysis.

The cluster analysis will now be described with reference to FIG. 14.

Firstly, n data of n cluster contained in one is produced (Step ST21). The total number of clusters n is D (Step ST22), this total number of clusters D is assigned from up to 3 by the process of integration (Steps ST23 to ST43).

That is, Steps ST23 to ST41 are preformed as one process, K is a cluster, two clusters nearest together can be integrated in one cluster of K−1.

The integration consists of finding the distance between the clusters for all the clusters, then two clusters with the smallest distance between them are taken as the same cluster. In this case the shortes distance between the data comprising the clusters is the shortest distance between the clusters.

In this embodiment, the distance L is found for the number of data n, given as data fi(K) ($0 \leq K < n_1$) of cluster i and the number of data n2 given as data fj(E) ($0 \leq E < n_2$) of cluster j, all the data and all the combinations of all the clusters are examined, the minimum value Lmin of the distance L is obtained for cluster x and cluster y.

The distance L between data is found in accordance with the calculation by Equation (17).

$$L = \sqrt{(Ri' - Rj')^2 + (Gi' - Gj')^2 + (Bi' + Bj')^2} \quad (17)$$

$$fi(k) = (Ri',Gi',Bi'), fj(m) = (Rj',Gj',Bj')$$

The shortest distance Lmin thus found for the data of two clusters x and y, is integrated in one, as one cluster. This integration is performed until ultimately the cluster number D becomes 3.

Figure 15:
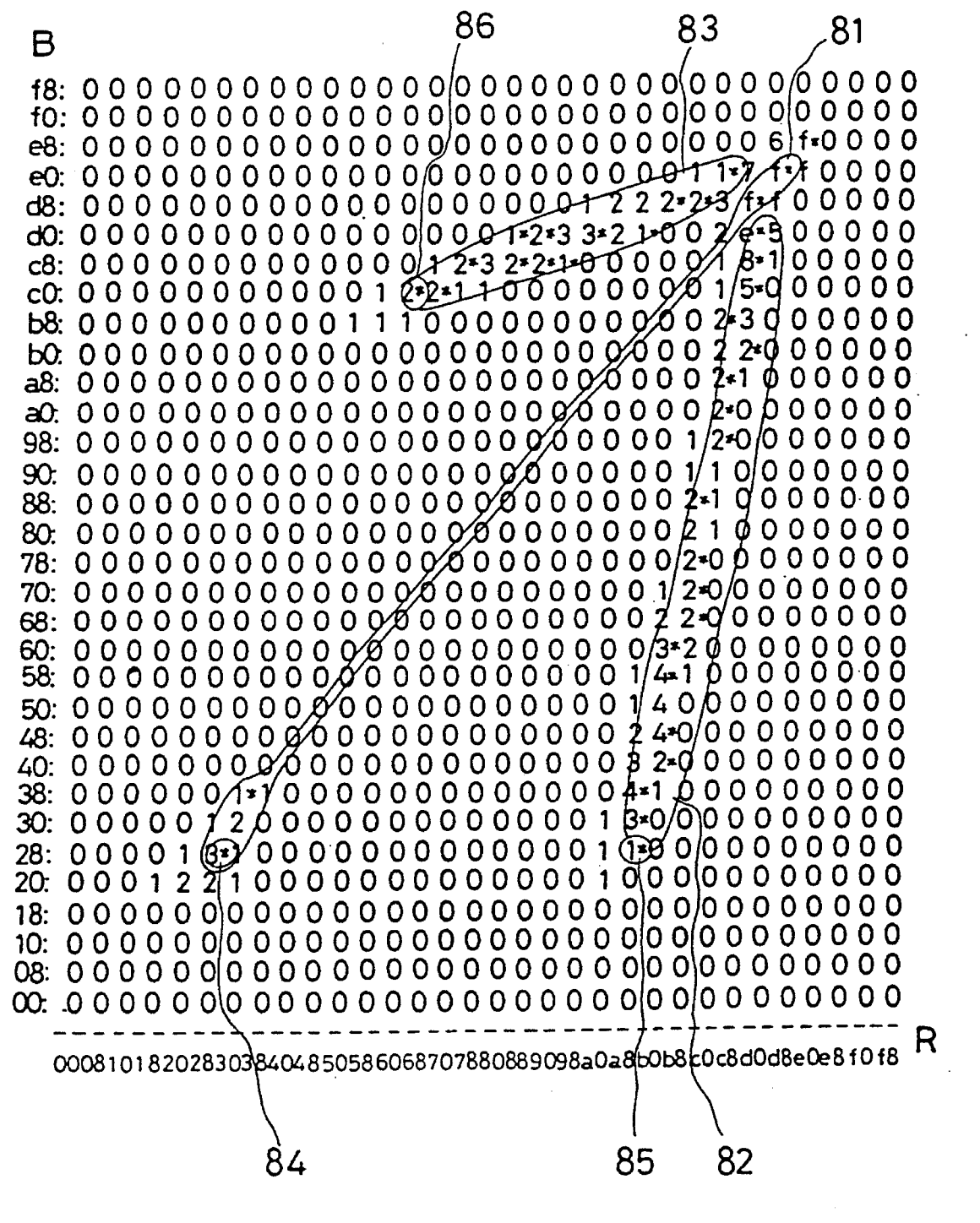

The respective data of the proximal values of the three clusters obtained from the results of the above-mentioned cluster analysis are accumulated. Consequently, the data is converted in FIG. 12 by the above-mentioned Equation (16) and the clusters are classified into the three relevant clusters such as shown in FIG. 15. These three clusters 81, 82 and 83 correspond to the respective colors used in the printing of object 100.

Figure 16:
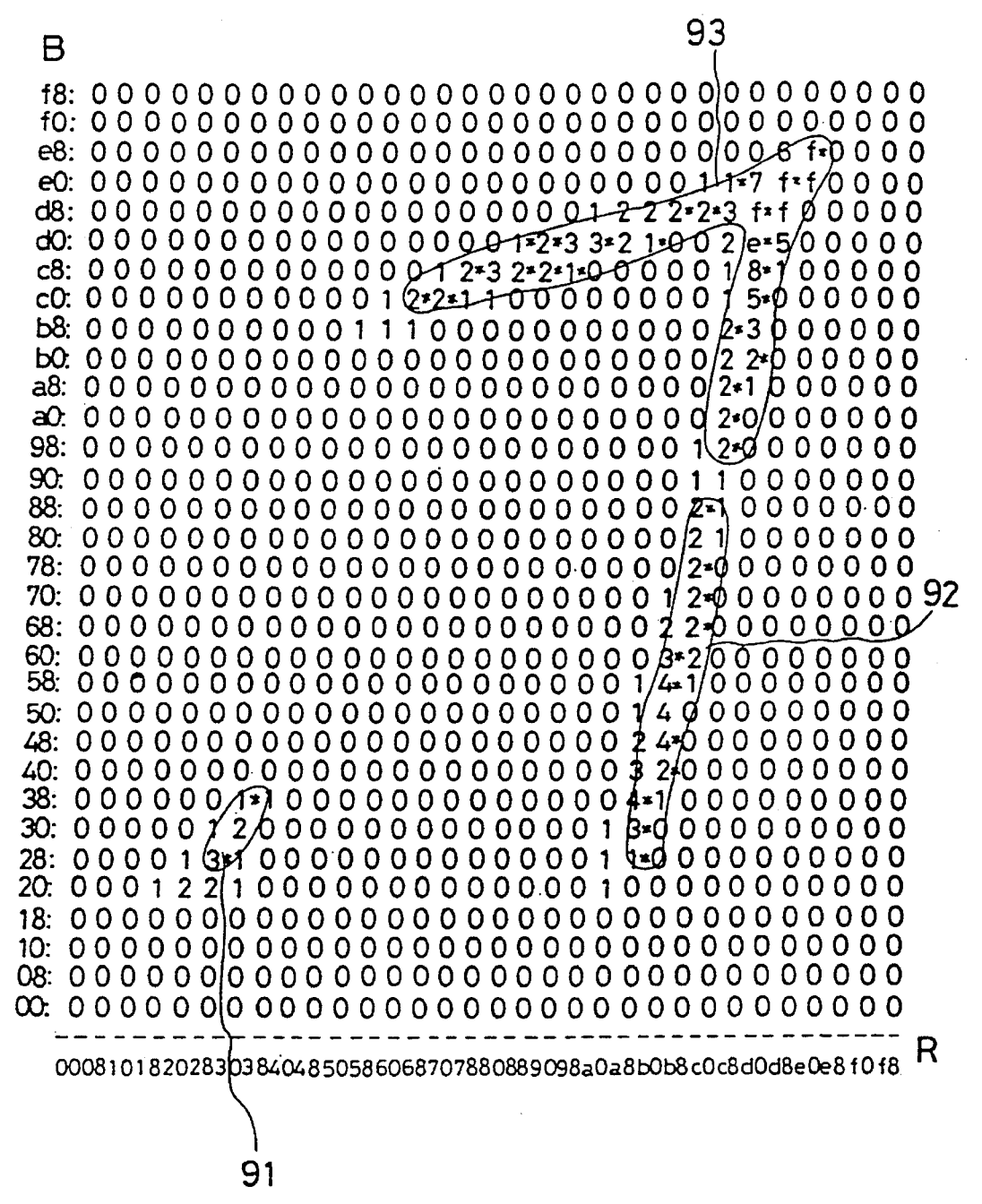

When the conversion of the data is not in accordance with Equation (15), the classification of three clusters 91, 92 and 93 is incorrect, as shown in FIG. 16.

When the above-mentioned cluster analysis process is complete, before conversion of the respective data of each of the three clusters 81, 82 and 83 by Equation (15), the corresponding RGB data is taken. The three points nearest to the RGB data at '0' are selected, in effect as in FIG. 15, the peaks 84, 85 and 86 are each found (Step ST16). The RGB data in the peaks is Ri, Gi, Bi, the minimum value of each cluster data is found by Equation (18).

$$\min_{i \in Cj} \sqrt{Ri^2 + Gi^2 + Bi^2} \quad (18)$$

Cj is the set of the peaks in each clusters (j = 0,1,2)

The three points 84, 85 and 86 thus found, are the data for the colors used in the printing. This RGB data is the result of the color discrimination which is output by output circuit 140 (Step ST17).

In this way, the color is classified from the peaks of the appearance frequency and the orientation of the standard color. The characteristic RGB values are extracted from every pixel of the color image of the subject. The extracted RGB values are converted to directional data from the standard color. This directional data is classified into groups and the discrimination of the colors used in the printing (recognition of the coloring) is performed.

In this case, the effect of the error produced by the color image input circuit 220 can be removed. In order to do this, for example when unnecessary data is included with the color data obtained by color image input circuit 220, the discrimination of the color used in the printing should be corrected. The result of this is that despite the coloring of the character 131 overprinted on the different colors printed on the two patterns 132 and 133, present on object 100, recognition of the three colors used in the printing can be obtained easily.

The flowchart of the above-mentioned color image conversion will now be described.

As mentioned above, it is obtained from the results of the color discrimination, for example the color C of the character 131 is recognised from the RGB data (point 84), the color P of the background 134 of object 100 is recognised from the RGB data (point 81), and the colors F1 and F2 of the first and second patterns 132 and 133 are recognised from the RGB data (point 85 or point 86).

Figure 17:
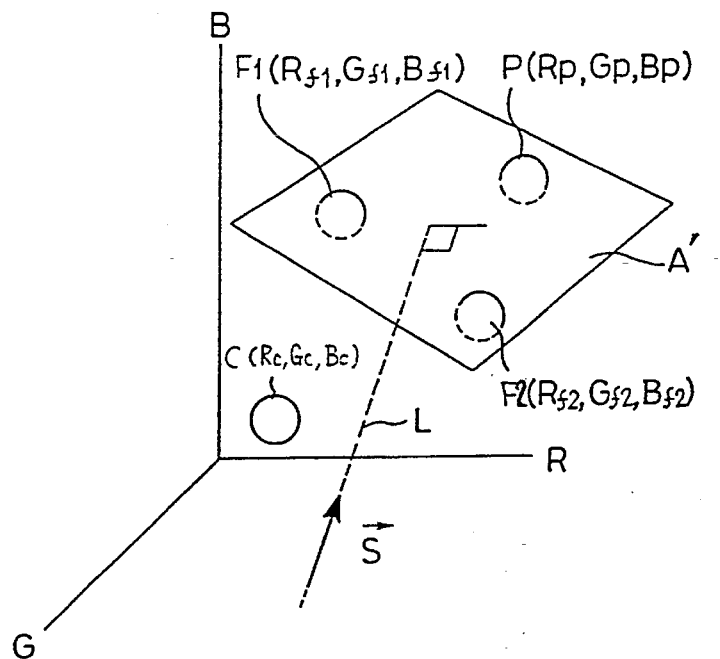
FIG. 17 is a drawing showing the method of calculating the calculation parameters.

In object 100, the color P of the background 134 is represented by RGB data (Rp, Gp, Bp), the colors F1 and F2 of the first and second patterns 132 and 133 are represented by RGB data {Rf1, Gf1, Bf1} and (Rf2, Gf2, Bf2), as shown in FIG. 17, in the color space of RGB, the three points P, F1, F2 are each arranged, in the three dimensional space, spread out on plane A'.

In the RGB space, the distance from this plane A' up to each point P, F1 and F2 is '0', conversely the distance to the point C of the character 131 to be extracted is the value '≠0'. Therefore, it is possible to extract the character 131 easily using the distance from the plane A'.

Where the variable density information on the character 131 is blurred etc, by positioning between the point C and the above-mentioned plane A', the variable density information of this distance is maintained.

A correlation value can be obtained for the distance from the plane A' and the size of the projection of the perpendicular vector $\vec{S}$ to this plane A'.

Figure 18:
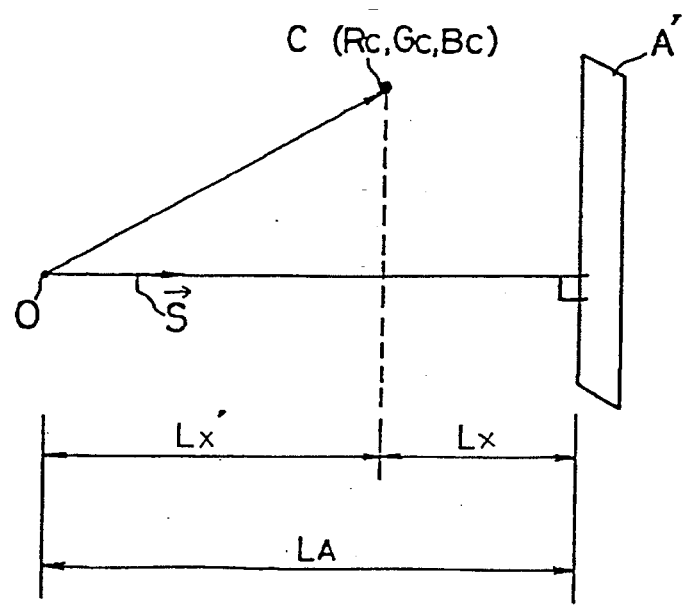
FIG. 18 is a drawing showing the method for finding the length of the projection calculated by the calculation parameters.

That is, as shown in FIG. 18, the distance from point C(Rc,Gc,Bc) of the arbitrary color coordinates space to plane A' corresponds to Lx, the distance LA from point of origin 0 up to plane A' is fixed, Lx'=LA−Lx, the distance from the plane A' becomes the reflected value. This value Lx', can be found as the size of the projection of the vector $\vec{C}$ projected to the perpendicular vector $\vec{S}$ in plane A'.

Figure 19:
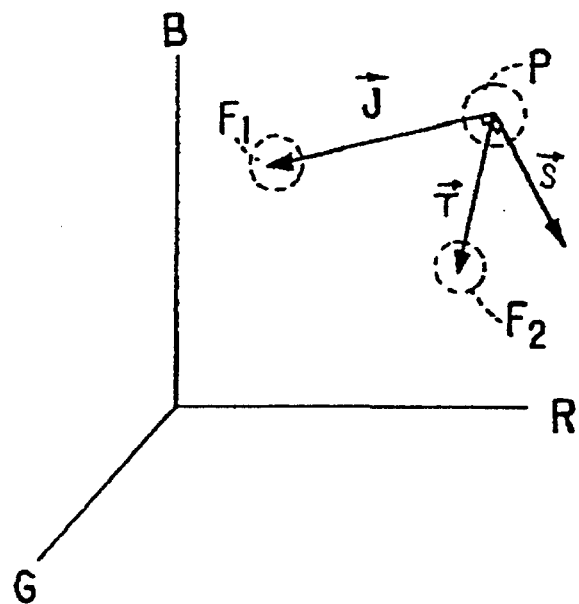
FIG. 19 is a drawing showing an example of the density distribution in the variable density image after conversion.

The perpendicular vector $\vec{S}$ to plane A', the two vectors comprising plane A', for example as shown in FIG. 19 the two vectors $\vec{J}$ and $\vec{T}$ are the perpendicular vectors of points F1 and F2 of the first and second patterns 132 and 133 to point P of the background 134. Because the perpendicular vector $\vec{S}$ to plane A' is found, the two vectors $\vec{J}$ and $\vec{T}$, both perpendicular vectors, are also found, then the outer product of these two vectors $\vec{J}$ and $\vec{T}$ can be found.

In this case, vector $\vec{J}$ (Rf1-Rfp, Gf1-Gp, Gf1-Bp) and vector $\vec{T}$(Rf2-Rp, Gf2-Gp, Bf2-Bp) are each found. Therefore, the vector $\vec{S}$ perpendicular to plane A' is found by calculation of Equation (19) as the outer product of the vector $\vec{J}$ and the vector $\vec{T}$.

$$\vec{S} = \vec{J} \times \vec{T} = \tag{19}$$

$$((Gf1 - Gp) \cdot (Bf2 - Bp) - (Bf1 - Bp) \cdot (Gf2 - Gp),$$
$$(Bf1 - Bp) \cdot (Rf2 - Rp) - (Rf1 - Rp) \cdot (Bf2 - Bp),$$
$$(Rf1 - Rp) \cdot (Gf2 - Gp) - (Gf1 - Gp) \cdot (Rf2 - Rp))$$

The reflected value Lx' is found from the distance from plane A' of the arbitrary points of the RGB data (Ri,Gi,Bi), the length of the projection to vector $\vec{S}$ is found appropriately by the above-mentioned Equation (19), then this conversion (projection) value Y, can be calculated by Equation (20).

$$Y = \tag{20}$$
$$\{(Gf1 - Gp) \cdot (Bf2 - Bp) - (Bf1 - Bp) \cdot (Gf2 - Gp)\} \cdot Ri +$$
$$\{(Bf1 - Bp) \cdot (Rf2 - Rp) - (Rf1 - Rp) \cdot (Bf2 - Bp)\} \cdot Gi +$$
$$\{(Rf1 - Rp) \cdot (Gf2 - Gp) - (Gf1 - Gp) \cdot (Rf2 - Rp)\} \cdot Bi$$

Taking the point of origin '0' of the color space as well as the maximum value taken from plane A', this conversion Y is the distance reflected from plane A'.

Figure 20:
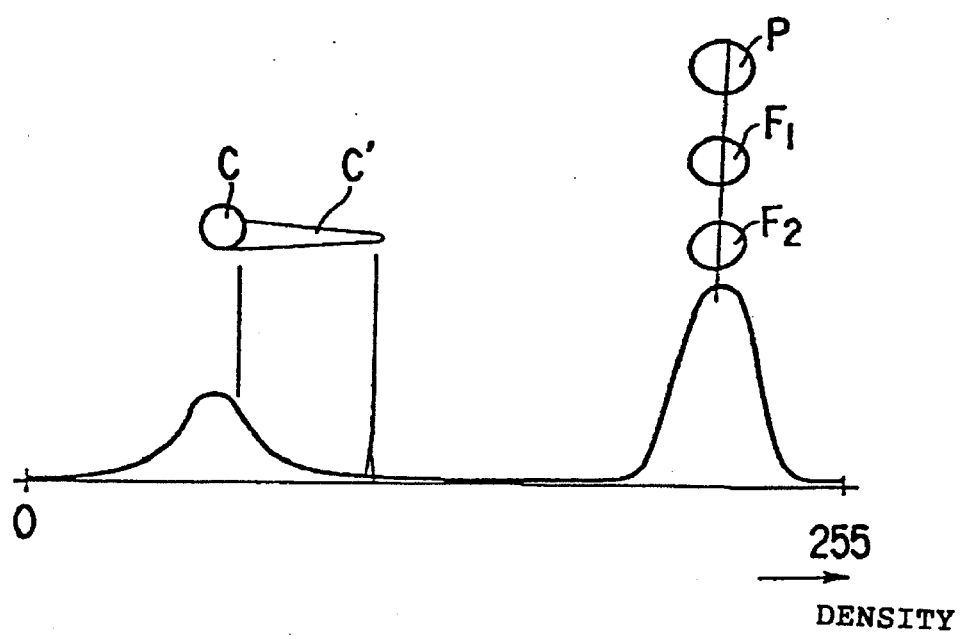
FIG. 20 is a graph showing an example of the density distribution in the variable density image after conversion.

In this way, RGB values representing the color P of the background 134 of object 100 and the colors F1 and F2 of the first and second patterns 132 and 133 input are substituted by the projection vector $\vec{S}$ found using the above-mentioned Equation (19), the R, G, B digital image signal is converted by the above-mentioned Equation (20) into the variable density image from which character 131 only can be extracted. That is, by the above-mentioned method, as shown FIG. 20, the color P of the background 134 of object 100 and the colors F1 and F2 of the first and second patterns 132 and 133 are taken as practically the same density value, the point C of character 131 can be easily distinguished and it is possible for the conversion into the image of the density distribution to be performed.

With respect to the variable density information of character 131, where the printing is blurred etc, for example taking part of the value as C', this information can be maintained.

In this way, the color image conversion is executed in accordance with the above-mentioned Equation (20), character 131 is extracted from the background, that is, the first and second patterns 132 and 133 can be dropped out simultaneously, and character 131 containing the variable density information can be extracted.

It can be seen from the above, that the character contained in the variable density information can be extracted.

That is, the projected vector is found by the RGB value representing the colors of the first and second patterns and the color of the background of the object which are input, the RGB digital image signal is converted into the variable density image in which the character only is extracted. This enables the variable density information to be maintained as it is, and the character only is read faithfully. Therefore, the number only can be read precisely on valuable securities etc. which have plural patterns by dropping out the differing colorings, after the examination is possible to perform accurate processing.

In this embodiment, the postal code for example can be read accurately from items of mail.

Figure 21:
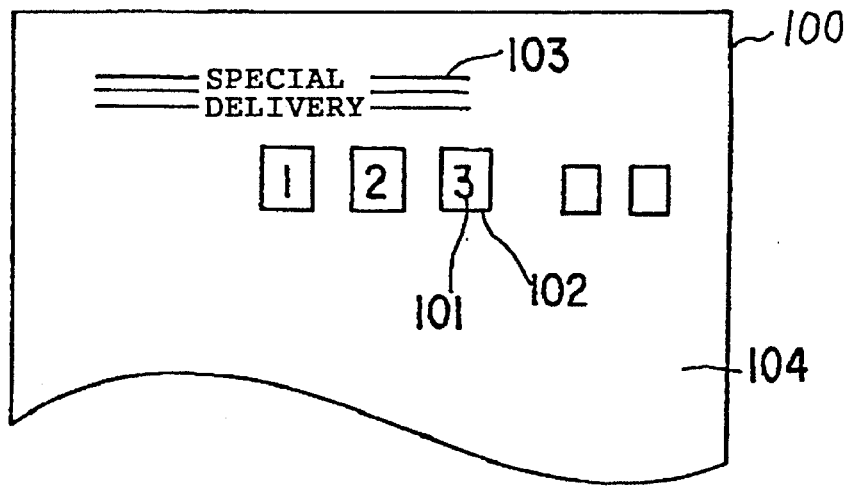
FIG. 21 is a drawing showing an example of the object to be read, the special delivery code on an item of mail.

That is, as shown in FIG. 21, present on the item of mail which is object 100, are for example the postal code 101 in the entry frame 102, and the special delivery stamp 103, each in different colorings. By the above-mentioned method, the influence of the color 104 of the background on the entry frame 102 and the special delivery stamp 103 is dropped out and simultaneously only the postal code 101 containing the variable density information can be extracted.

Figure 22:
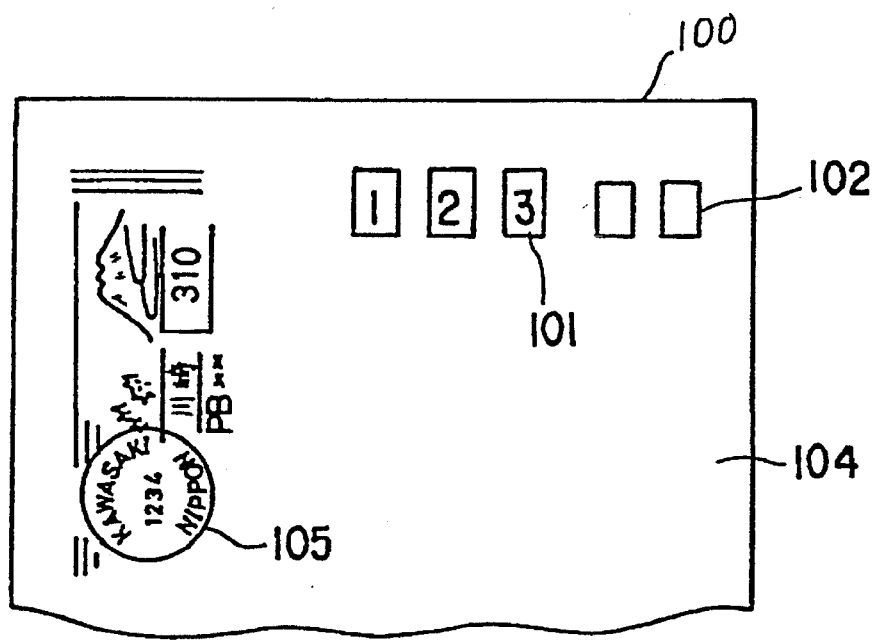
FIG. 22 is a drawing showing an example of the object to be read, the franking on an item of mail.

In the same way, as shown in FIG. 22, on the item of mail which is object 100, for example when the postal code 101 and the entry frame 102, and the indicia 105 are each present in different colorings, by the above-mentioned method, the influence of the entry frame 102 and the indicia 105 and the color of the background 104 is dropped out at the same time only the postal code 101 containing the variable density information can be extracted.

By this means, the postal code can be read with accuracy on items of mail, after the postal code has been read and recognised the processing may proceed with improved accuracy.

Figure 23:
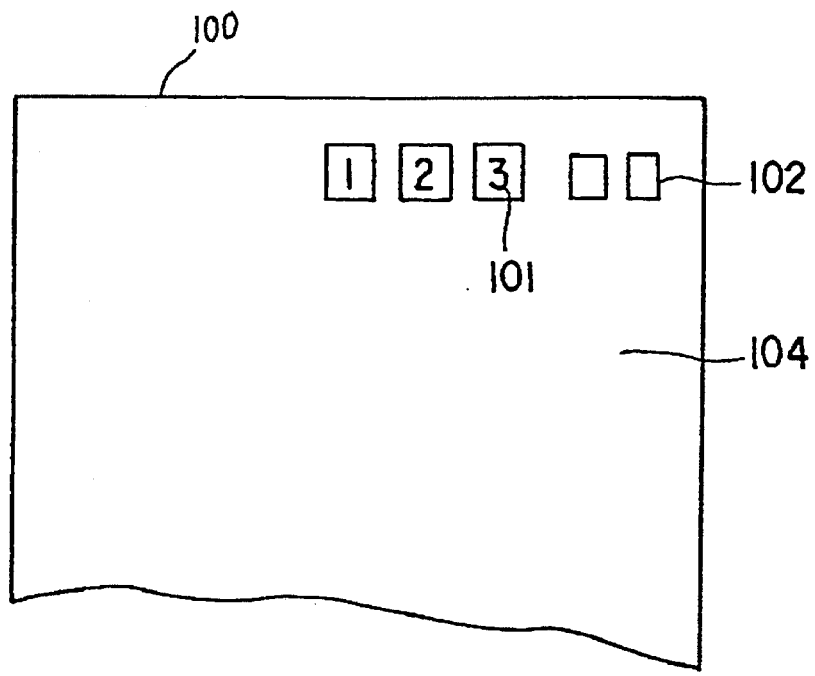
FIG. 23 is a drawing showing an example of the object to be read, the special delivery code without the franking on an item of mail.

Furthermore, in the above-mentioned embodiment, for example as shown in FIG. 23, where the postal code 101 and the entry frame 102 are present on object 100, which is the item of mail, changes in the color of the background 104, or changes in the color of the entry frame 102 or changes in the insertion color of the postal code 101 can be easily handled.

Figure 24:
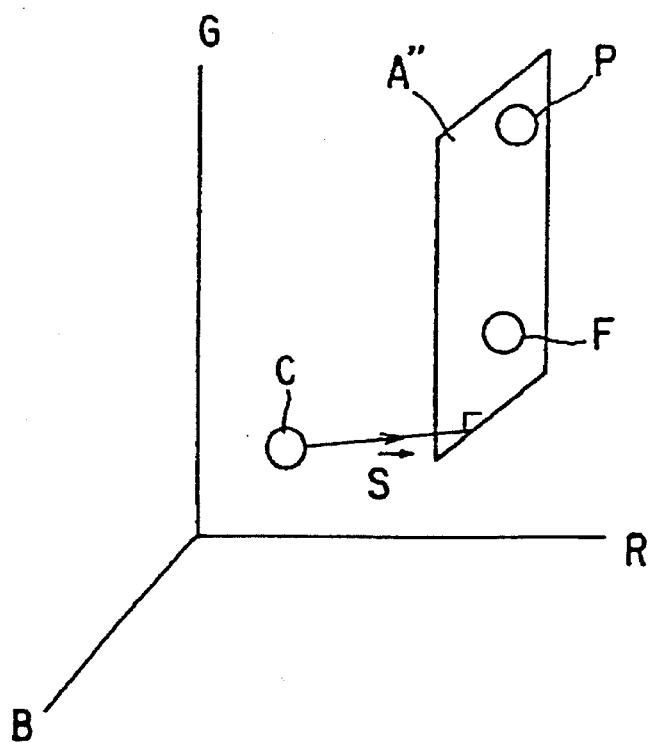
FIG. 24 is a drawing showing the method of calculation of the calculation parameters.

As shown in FIG. 24, the color P of the background 104 of the items of mail and the color F of the entry frame 102 and the color C of the postal code 101 are present in the color space of RGB, the color P of the background 104 of the item of mail and the color F of the entry frame 102 are contained within the plane, the maximum distance of the color C of the postal code 101 from the plane A" is found. The projection of the perpendicular vector $\vec{S}$ to this plane A" is found using the above-mentioned method in the same way, it is possible to extract satisfactorily only the brightness information and with a low contrast postal code 101 this variable density information can be maintained as it is and can be extracted in that form.

Figure 25:
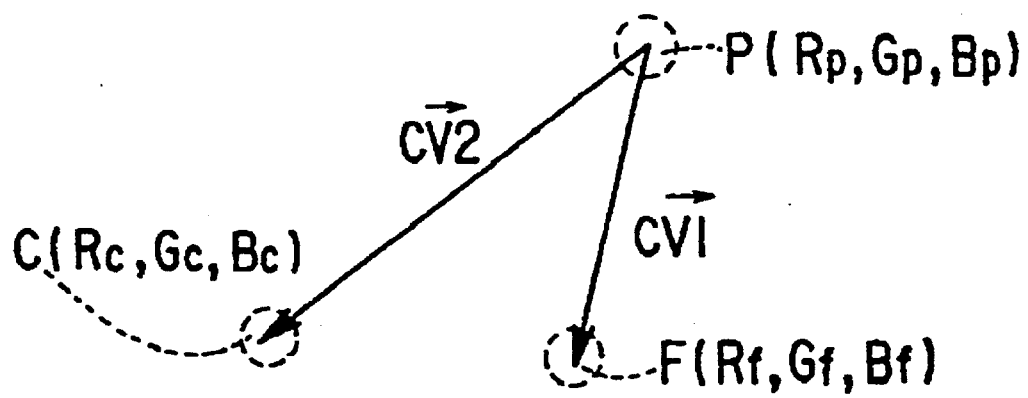
FIG. 25 is a drawing showing the method of finding the projection vector calculated by the calculation parameters.

That is, firstly, the RGB data (Rp,Gp,Bp), (Rf,Gf,Bf), (Rc,Gc,Bc) corresponding to the points P, F and C are found by the above-mentioned color image conversion. Then, as shown in FIG. 25, the directional vector $\vec{CV1}$ from point P to point F and the directional vector $\vec{CV2}$ from point P to point C are taken. The perpendicular projection vector $\vec{S}$ to the above-mentioned plane A" is found for both these two directional vectors $\vec{CV1}$ and $\vec{CV2}$ in accordance with Equation (21). Then in accordance with Equation (22), the conversion to the RGB data (Ri,Gi,Bi) of the arbitrary points is performed. By this means the postal code 101 only can be extracted accurately.

$$S = (\alpha, \beta, \gamma) = \frac{(CV1, CV2)}{|CV1|^2} CV2 - CV1 \tag{21}$$

$$Y = \alpha Ri + \beta Gi + \gamma Bi \tag{22}$$

In this way, despite the presence or absence of special delivery stamps and indicia, only the postal code can be extracted from the item of mail, and it is possible to change the color of the background or the corresponding faintness.

In any case the present invention is not limited to extracting the postal code, it is suitable for the extraction of all types of information, for example the name and address etc. recorded on items of mail.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

As described above, the present invention provides a character reading system which enables the dropping out of plural coloring from the information so that only the characters can be read and improves the freedom to drop out the coloring information in the object as well as corresponding faintness in the coloring of the object.

Also, the present invention provides a character reading system which enables an improved degree of accuracy in the final stage of the processing.

What is claimed is:

1. An apparatus for extracting a first pattern from a color object containing, on a background, the first pattern, a second pattern and a third pattern, the first pattern being represented by a first color, the second pattern being represented by a second color, the third pattern being represented by a third color, and the background being represented by a fourth color, the apparatus comprising:

reading means for reading the color object so as to obtain main color data, the main color data comprising first, second, third and fourth color data corresponding to the first, second, third and fourth color, respectively, the first, second and third color data each having a first, a second and a third color component; and outputting means for outputting an extracted first pattern, the outputting means comprising:
  means for producing a density histogram based upon the main color data;
  means for detecting the color components of each of the first, second, third and fourth color data from the density histogram, wherein the detecting means includes:
    means for determining peaks within the density histogram:
    means for selecting the fourth color as a standard color;
    means for converting each peak into directional data having a predetermined volume with respect to the standard color, each directional data being oriented to the corresponding peak;
    means for cluster analyzing so as to classify the directional data into three sets of cluster data; and
    means for selecting the minimum value from each of the three sets of cluster data as the color components of each of the first, second, and third color data;
  means for calculating first parameter data corresponding to the detected color components, second parameter data corresponding to the detected color components and third parameter data corresponding to the detected color components;
  means for converting, based upon the first, second and third parameter data, the first color data into first density data and the second, third and fourth color data into second density data; and
  means for extracting the first pattern from the color object in accordance with the first and second density data, thereby producing the extracted first pattern.

2. An apparatus for extracting a first pattern from a color object containing, on a background, the first pattern, a second pattern, a third pattern, the first pattern being represented by a first color, the second pattern being represented by a second color, the third pattern being represented by a third color, the background being represented by a fourth color, the apparatus comprising:

reading means for reading the color object so as to obtain main color data, the main color data comprising first, second, third and fourth color data corresponding to the first, second, third and fourth color, respectively, the first, second, third and fourth color data each having a first, second and third color component; and outputting means for outputting an extracted first pattern, the outputting means comprising:
  means for detecting the first color components, the second color components and the third color components of the main color data;
  means for calculating an outer product based upon the first, second and third color components of the second, third and fourth color data so as to obtain first parameter data corresponding to the detected first, second and third color components, second parameter data corresponding to the detected first, second and third color components and third parameter data corresponding to the detected first, second and third color components;
  means for converting, based upon the first, second and third parameter data, the first color data into first density data, and the second, third and fourth color data into second density data; and
  means for extracting the first pattern from the color object in accordance with the first and second density data, thereby producing the extracted first pattern.

* * * * *